United States Patent [19]
Atkinson

[11] 4,038,791
[45] Aug. 2, 1977

[54] WINDOW GREENHOUSE

[76] Inventor: John W. Atkinson, 420 Huchison St., Vista, Calif. 92083

[21] Appl. No.: 737,696

[22] Filed: Nov. 1, 1976

[51] Int. Cl.² ............................................. E04B 1/34
[52] U.S. Cl. .................................... 52/36; 52/73; 312/102
[58] Field of Search ................. 52/201, 204, 213, 36, 52/211, 214, 73; 47/40; 312/102

[56] References Cited
U.S. PATENT DOCUMENTS

| | | | |
|---|---|---|---|
| 1,341,822 | 6/1920 | Quackenboss | 312/102 |
| 2,015,447 | 9/1935 | Esser | 52/213 |
| 2,834,441 | 5/1958 | Mims | 52/73 |
| 3,074,125 | 1/1963 | Miller | 52/73 |
| 3,310,927 | 3/1967 | Persson | 52/213 |

*Primary Examiner*—John E. Murtagh
*Attorney, Agent, or Firm*—Warren F. B. Lindsley

[57] ABSTRACT

A window greenhouse prefabricated from a plurality of sections of extruded material and panels of predetermined lengths and sizes that may be assembled and mounted in an existing window opening on the window frame for which it was designed.

8 Claims, 27 Drawing Figures

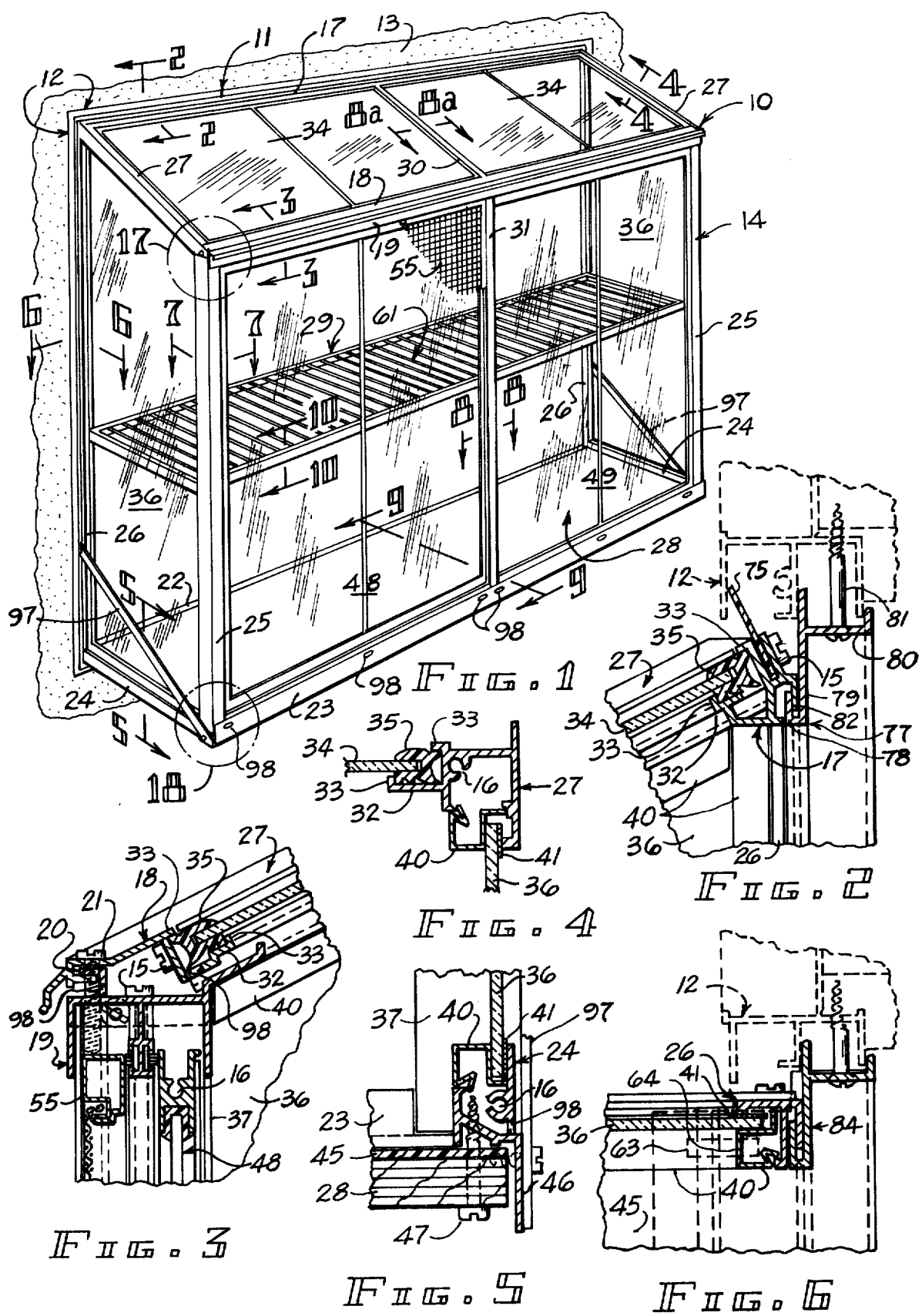

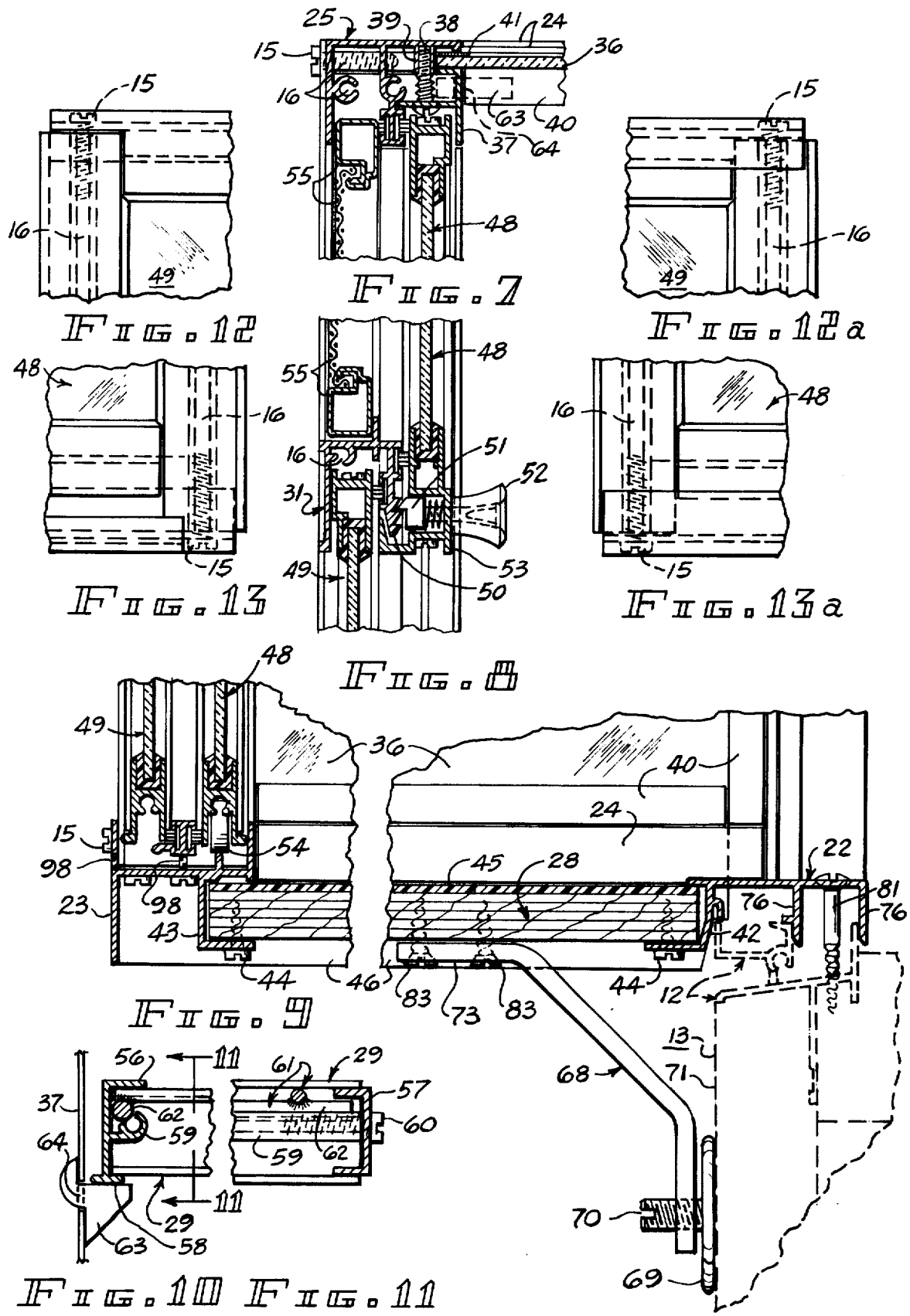

WINDOW GREENHOUSE

BACKGROUND OF THE INVENTION

This invention relates to window greenhouses, conservatories or the like adapted for attachment to an existing window frame in a window opening of a building intended for use in providing a proper environment, conducive to the cultivation and growth of botanical life.

FIELD OF THE INVENTION

This invention is particularly directed to a lightweight, sturdy and inexpensive window greenhouse structure, comprising a frame portion of extruded sections of material, side, top and front panels of transparent material one of which may be opened to provide ventilation, a sturdy base portion and an adjustable, ventilated shelf structure.

These components may quickly and easily be assembled, together with suitable weather stripping and snap-on glazing members to provide a completely assembled weather-tight window greenhouse that may be easily and securely attached to the frame of an existing window with self-tapping screws.

DESCRIPTION OF THE PRIOR ART

Heretofore, many types of window greenhouses, conservatories and the like have been devised and utilized in association with existing window openings and window frames of residential or other buildings for the purpose of providing an environment, conducive to the cultivation and growth of plant life accessible from within the interior of the room or building on which they are installed.

Some of the known window greenhouses necessitated factory fabrication and assembly since their components call for welding or other extensive operations to join them into contiguous units. This method of fabrication necessitates the shipment of completely assembled greenhouses to the consumer at greatly increased cost.

Other prefabricated window greenhouses shipped in (knocked-down) packaged form to the consumer for assembly and installation in a window opening at the job site have many disadvantages among which are the following:

Most of these window greenhouses are so complicated in design, structure, and excessive use of component parts that they require the services of a skilled mechanic with special tools for their assembly and installation in an existing window opening.

Others have been designed in such a way as to require extensive alterations to the existing window frame and its opening to accommodate the assembled greenhouse.

Still others have been poorly designed with insufficient ventilation area to comply with existing city, county, and federal building codes that require all habitable rooms in a residence to have window areas equal to one-eighth the floor area of the room, and with 50 percent of those areas openable for ventilation purposes and preferably protected by suitable locking means when closed.

In order to obviate the disadvantages of the prior art, a new and improved window greenhouse is provided which is comparatively inexpensive to manufacture in precise sizes and quantities and ship to the consumer in disassembled, compact, packaged forms. The greenhouse may be assembled by the user or other unskilled persons with simple tools and then easily installed in existing window frame in the window opening of the residence for which it was specified. The performance of the assembly operation and installation procedure should be readily accomplished from the inside of the room or other area in which the window opening is located.

SUMMARY OF THE INVENTION

It is, therefore, one object of the present invention to provide a new and improved window greenhouse adapted for attachment in supporting relationship to an existing window frame of a residence or other building structure.

Another object of this invention is to provide a new and improved window greenhouse having sliding, rolling, or other moveable panel areas that are capable of providing the required ventilating areas to comply with most existing building codes.

A further object of this invention is to provide an improved window greenhouse, the components of which include a plurality of sections of extruded material and glazed transparent panels that are fabricated in predetermined lengths and sizes at the factory and shipped to the consumer in (knocked-down) disassembled, packaged form where they are mechanically joined by means of self-tapping screws securely fitted into suitable bosses to complete the assembly of the unit.

A still further object of this invention is to provide an improved window greenhouse in which a novel glazing means is employed that would permit the replacement of broken or damaged window panes without dismantling or weakening any part of the other assembled units in the structural frame.

A still further object of the present invention is to provide an improved window greenhouse structure that employs an adjustable, open wire-type of shelf that is light in weight and strong enough to span a distance equal to the inside width of the structure while supporting a considerable amount of live movable weight.

Further objects and advantages of the invention will become apparent as the following description proceeds, and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings, in which:

FIG. 1 is a perspective view of a window greenhouse of the present invention illustrating how it would appear from the outside of the building in the window opening of an existing window frame.

FIG. 2 is a vertical sectional view taken on the line 2—2 of FIG. 1 illustrating the preferred method of attaching the uppermost longitudinal frame head member of the structure to the existing longitudinal window frame head member by means of an intermediate interlocking, longitudinal member and suitable screws.

FIG. 3 is a vertical sectional view taken on the line 3—3 of FIG. 1 illustrating the method of attaching the front longitudinal eave member to one end of the sloping end gable members and the front longitudinal head frame member of the structure by means of their interlocking sections.

FIG. 4 is a vertical sectional view taken on the line 4—4 of FIG. 1 through the right hand, sloping end gable member showing the method of using flexible glazing means and snap-on glazing members for containing and supporting the edges of the fixed, transparent roof panels and side panels in place.

FIG. 5 is a vertical sectional view taken on the line 5—5 of FIG. 1 through the right hand forwardly projecting sill member and floor of the structure showing the method of containing and supporting the bottom edge of the fixed transparent side panel in the sill member and on the floor of the structure.

FIG. 6 is a horizontal sectional plan view taken on the line 6—6 of FIG. 1 illustrating the method of utilizing an intermediate vertical frame member and screws for attaching the vertical jamb frame member of the structure to the jamb of the existing window frame.

FIG. 7 is a horizontal sectional plan view taken on the line 7—7 of FIG. 1 through the corner mullion of the assembled greenhouse structure, showing its relation to the fixed gable end panel and sash side rails. The openable sash 48 is indicated to delineate its relative location within the vertical corner mullion frame.

FIG. 8 is a horizontal sectional plan view taken on the line 8—8 of FIG. 1 through the centrally located vertical interlocking mullion showing the relation of the fixed sash side rail and openable sash side rail to the mullion and the locking device when the sash is in fixed and locked relation to the mullion.

FIG. 9 is a vertical sectional view taken on the line 9—9 of FIG. 1 through the floor, the horizontal front sill member and the rear horizontal sill member of the assembled greenhouse frame structure with the sill and frame of the existing window opening (shown in dash line) showing the method of containing and supporting the floor in the respective sill members and attaching the rear sill member of the structure to the existing window frame by means of screws and further showing one method attaching optional adjustable brackets to the underside of the floor and pressing against the face of the building wall for support.

FIG. 10 is a fragmentary, vertical sectional view taken on the line 10—10 of FIG. 1 through one of the longitudinally extending parallel side rail members of the open shelf member showing the means of supporting the open top grill portion of the shelf in rigid relation to the side rail members and the means for supporting the assembled shelf in adjustable vertical relation on the vertical jamb members of the greenhouse's structural frame.

FIG. 11 is a fragmentary vertical sectional view taken on the line 11—11 of FIG. 10 showing the method of completing the assembly of the open shelf by attaching end frame section members to the parallel side rail members by means of self-tapping screws that are screwed into spaced, integral screw bosses on said side rail members.

FIG. 12 is a typical elevational view showing one side of the junction of the head and jamb sash members or bottom and jamb sash members of the fixed window panel and of the side of the openable window that does not engage the fixed mullion.

FIG. 12a is a typical elevation of the opposite side of FIG. 12.

FIG. 13 is a typical elevational view showing one side of the junction of the openable window mullion meeting rail with its head frame member or with the bottom frame member.

FIG. 13a is a typical elevation of the opposite side of FIG. 13.

DESCRIPTION OF THE PREFERRED EMBODIMENT

Figure 8A:
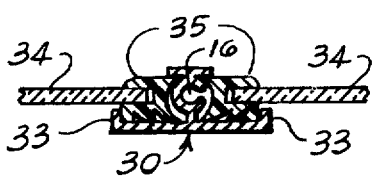
FIG. 8a is a vertical sectional view taken on the line 8a—8a of FIG. 1 showing a typical fixed mullion design that may be used for halving of the transparent fixed top panel.

Referring more particularly to the drawings by characters of reference, FIG. 1 discloses a completely assembled window greenhouse 10 installed in an existing window opening 11 mounted on an existing window frame 12 in an outside wall 13 of a residence or other building.

The greenhouse 10 is substantially of rectangular, box-like form, the component parts of which include a rigid frame structure 14 that is designed to delineate the shape of the enclosure by the inter-connection of a plurality of individual extruded, lightweight aluminum or plastic sections from which it is formed.

The individual extruded sections of the frame are cut to their proper lengths, coped or cut away at their mating ends and other locations where they intersect with other extruded sections. These sections are adapted to be mechanically joined by means of self tapping screws 15 securely fitted into screw bosses 16 that are integrally formed in the individual sections adjacent their ends or points of intersection in such a manner as to provide permanent, weathertight joints in the assembled frame structure 14.

The frame structure consists of a top, rear, horizontally disposed, longitudinally extending head section 17 and a longitudinally extending front eave section 18. Eave section 18 is attached to and aids in the support of a longitudinally extending front head frame section 19 of the same length by means of integral interlocking extensions 20 that are a part of the individual sections and the self tapping screws 21, as shown in FIG. 3 of the drawings.

The frame structure 14 also includes parallel, longitudinally extending bottom, rear and front sill sections 22 and 23, respectively, that are connected at their ends in parallel, horizontal relation to the ends of the forwardly extending right and left hand side sill sections 24. The rear sill sections 22 and 23 are also connected to the vertically extending corner jamb sections 25 and to the front bottom ends of the rear vertically extending jamb frame section 26.

The vertically extending front and rear corner jamb sections 25 and 26 are securely connected at their top ends to the respective ends of the sloping gable, side rail sections 27, to the respective ends of the top, rear head rail section 17, and to the combined front eave section 18 and the front head frame section 19 by means of the self-tapping screws 15 and their associated screw bosses 16. This assembly forms the intersecting corner joints of the assembled, rigid frame structure 14, as indicated in FIGS. 1, 2, 3, 5, 7, 17 and 18 of the drawings.

Because the required overall width of the greenhouse frame 14 is determined by the width of the existing window frame 12 to which it is to be attached, such widths in some instances might result in too great a span of the horizontally disposed, longitudinally extending greenhouse frame members to adequately strengthen and support the structure to prevent possible collapse or bending of the respective frame members under their own weight and of the plant life supported thereby.

In order to reinforce the frame of the greenhouse structure, the wide, rectangular open ceiling area and the wide, rectangular open frontal area of the frame are divided midway by vertically disposed mullion members 30 and 31, respectively. These mullion members are fabricated of extruded sections and connected in secure relation to their respective meeting rails, longitudinally extending head section 17, the front eave section 18, front head frame section 19 and the front sill section 23 by self-tapping screws 15 and the integral screw bosses 16 provided adjacent the ends of each section.

The frame members which are utilized to define the open areas in the frame structure 14 of the window greenhouse are provided with means for receiving and containing in weather-tight, separately removable relation, glazed panels of transparent material such as glass or clear plastic. These panels are preferably prefabricated and sized together with their respective frames, glazing beads and weatherstrip to fit snugly into said open areas of the frame structure.

To provide for quick and easy installation or removal of said glazed transparent panels into or out of the open areas of the assembled frame, some of the extruded sections which form these areas, such as the head section 17, front eave section 18, upper side rail sections 27, and area dividing mullion section 30 are provided with inwardly projecting, integral, recess forming extensions 32. These extensions have right-angled retaining lips 33 that are adapted to receive, support and retain the perimeter edges of an identical pair of transparent panels 34 by means of flexible glazing beads 35 that surround the perimeters of said panels to thereby retain the same in fixed but removable relation in the sloping, half gable ceiling or roof areas of the frame, as shown in FIGS. 1, 2, 3 and 4 of the drawings.

A pair of identical interchangeable transparent side panels 36 are installed in the open side areas of the frame defined by the upper, sloping side rail sections 27, rear vertical jamb sections 26, front vertical corner jamb sections 25, together with vertically disposed closure members 37. These panels are attached to the corner jamb sections 25 by means of self-tapping screws 38 that extend through a leg of the closure members into screw boxes 39 that are integrally formed on the inside vertical face of one leg of the jamb sections 25 and by the respective bottom side sill sections 24 which are secured thereto by screws and screw bosses in a like manner.

The perimeter side, top and bottom edge faces of the transparent side panels 36 are provided with strips of suitable weatherstripping material 41, such as mohair, felt or the like. The perimeter edges of these panels are supported and retained in fixed, weathertight relationship in recesses formed by the flexible snap-on glazing members 40 that surround three sides of the panels and come into tight contact with the projecting legs of the extruded sections of the frame when the same are snapped into place, as indicated in FIGS. 4, 5, 6 and 7 of the drawings.

The extruded sections 22, 23 and 24 that define the open rectangular area at the bottom of the assembled rigid frame structure 14 are provided with depending, longitudinally extending leg portions 42 and 43 having right-angled, inwardly projecting ends or hooks that form ledges and cavities that extend the full length of these sections on which the rear and front edges of the rectangular floor panel 28 are mounted and retained by suitably spaced screws 44.

Floor panel 28 is preferably fabricated of material such as plywood having the necessary strength to support the loads that it must carry and is covered with a top layer of laminated plastic material 45 which serves to protect the plywood base from moisture deterioration and provide for easy cleaning of its exposed top surface. The side end portions of the floor panel are covered and retained from longitudinal movement by means of the depending leg portions 46 of the bottom side sill sections 24 and the self-tapping screws 47, as shown in FIGS. 5 and 9 of the drawings.

The front open areas of the assembled structural frame 14 are defined by the longitudinally extending top head section 19, vertical corner jamb sections 25 together with their attached vertical closure members 37, vertical mullion member 31 which divides the wide open area into two areas of equal size, and the longitudinally extending front sill section 23. All of these associated extruded sections or frame members are provided with integral inwardly projecting legs or other means which cooperate to divide the space between the inside and outside sections into two separated parallel side by side channels that extend around the perimeters of the rectangular open areas of the frame.

One of the so-formed continuous channels, preferably the inside channel, is adapted to receive, support and retain a framed and glazed panel 48 of transparent material in rolling or sliding longitudinally movable relationship. The outside channel is adapted to receive, support and retain a framed and glazed panel 49 of transparent material in fixed relationship to the frame. Both panels are capable of easy removal and replacement when required.

The vertical mullion member 31 which divides the front open area of the frame into two separate areas for the reception of sliding and fixed sashes 48 and 49, respectively, is provided at an easily accessible point on its vertical length with a notched extension 50 in its channel forming projection, as shown in FIG. 8 of the drawing. This notched extension 50 is adapted to cooperate with the spring biased notched end 51 of a suitable pull knob 52 that is mounted in an extension 53 of the right hand jamb frame member of the glazed, sliding or rolling panel 48.

This notch and end of the knob 52 provides a means for interlocking the openable panel with the vertical mullion member 31 of the structural frame 14 of the greenhouse.

It should be noted that the openable, framed and glazed panel 48 has been mentioned as being either a rolling or sliding sash member, and as shown in FIG. 9, it is provided with rollers 54 that are pivotally mounted in a central recess formed in the sill portion of its frame. These are rollers adapted to roll on the top edge of an integral projection centered in the formed inside channel of structural frame sill section 23. It should be understood that rollers 54 may be eliminated and the height of the centered channel projection increased to allow the sill portion of the openable framed panel 48 to rest and slide directly on the top edge of the centered channel projection.

A framed insect screen 55 sized and adapted to fit snugly into the front channeled open area directly in front of the openable rolling or sliding panel 48 provides the same type of ventilation as was derived from the openable area of the existing window which the assembled window greenhouse 10 is to replace.

The vertically adjustable easily removable shelf 29 that is preferably of open grill construction and strong enough to support a number of potted ornamental plants is shown in FIG. 1 of the drawings in its installed horizontal position in the greenhouse. It is utilized to permit the transmission of sunlight and ventilation throughout the enclosure. The construction details of shelf 29 which are illustrated in FIGS. 10 and 11 of the drawings include a frame composed of parallel, longitudinally extending side members 56 and transverse end members 57. The parallel side members 56 are extruded sections of angular form that are provided at the bottom end of their vertical leg portions with longitudinally extending, transverse feet or pads 58 and on their inner faces, with inwardly projecting screw bosses 59.

The screw bosses 59, together with self-tapping screws 60, are used to secure the ends of transverse channel shaped members 57 of the frame to the parallel, longitudinally extruding side frame members 56 thereof and to hold, support and retain the spaced wire shelf or grill assembly 61. This wire grill assembly consisting of a plurality of spaced wire sections welded in transverse relation to the parallel, longitudinally extending wire side rail members 62 is retained by the side rails and screw boss 59 through the clamping action produced by the screws 60 on said side rail members 56 as they are turned into the screw bosses 59 at the outer end corners of the frame to thus complete the assembly of the wire shelf member 29.

Shelf member 29 is supported in level horizontal relationship in the greenhouse enclosure by means of shelf brackets 63. These brackets are adapted to be inserted at any desirable level in vertically spaced rectangular apertures 64 that are provided in the inner faces of the vertically disposed closure members 37 and the inner faces of the vertical snap-on glazing members 40 located at the front and rear corner jamb sections 25 and 26, respectively, of the assembled greenhouse frame. Brackets 63 are provided with flat topped, inwardly projecting abutments on the surface of which the longitudinally extending feet or pads 58 of the side frame members 56 of the shelf 29 are adapted to rest to support the shelf at any desired level in the greenhouse.

INSTALLATION OF THE WINDOW GREENHOUSE

In order to facilitate the installation and attachment of the window greenhouse 10 in the existing window opening 11 and to the existing window frame 12 for which it was specified, one or more right angled brackets 68 (such as shown in FIG. 9) are utilized. These brackets may be plain or ornamental in appearance and are preferably fabricated of wrought iron or aluminum having sufficient strength to support the weight of the assembled greenhouse.

The number of brackets 68 required is dependent on the overall width of the greenhouse. The bracket presses against the face of the wall and is not attached to the wall. By this means, the window may be installed from the interior of the building or residence. The large flat head bolt 69 with notched end 70 provides means of adjusting the relative space that may occur between bracket 69 and the face 71 of wall 13. It should be noted that sill member 22 hooks over sill frame 12.

It should be noted that the overall width of the greenhouse and its rigid frame 14 is slightly less than the rectangular opening formed by the existing window frame 12. The overall height of the greenhouse frame at its rear open end is slightly greater than the height of the rectangular opening formed by the existing window frame. The variance in height results from the necessity of providing the longitudinally extending head section 17 of frame 14 with an integrally formed, angularly disposed, upwardly projecting, resilient (rubber-like) flashing means 75. This flashing means is adapted to extend up into the front channel of the head rail of the existing window frame 12 when frame head section 17 of frame 14 is attached thereto. This feature prevents the entrance of rain or other water into the otherwise open space formed by the interconnection of the head rail members 12 and 17 of the greenhouse.

This height variance also results from the necessity of providing the longitudinally extending sill member 22 of the frame 14 with integrally depending legs or extension portions 42 and 76 which are adapted to contact and rest on the upwardly projecting legs or extensions of the sill member of the existing window frame when the greenhouse is installed.

The greenhouse in its assembled form is light in weight since it is fabricated of lightweight extruded sections and lightweight transparent panels of glass or clear plastic. Becaused vertical mullion 31 is attached by means of screws which are located on the exterior, the sliding sash could be omitted during installation; but not the fixed sash. This component may be installed from the inside of the window opening subsequent to the installation of the major assembled portions of the greenhouse.

The assembled greenhouse is raised with the top head portion tilted inwardly. The sill member 22 is lowered over sill frame member 12. The head of greenhouse is then brought forward to align with head frame 12 and then the interlocking spline member is inserted.

The next step in the installation of the greenhouse is the attachment of head section 17 of the same to the head rail of the existing window frame 12 by means of the interlocking, longitudinally extending spline or member 77. Member 77 is right-angled in form and is provided with a recess-forming hook-like portion 78 at the inner end of its vertically depending leg 79. Its other right-angled leg 80 is perpendicular thereto and provided with suitable extensions and abutments that are adapted to contact and align the interlocking head frame member 77 when it is securely attached to the head rail of the existing window frame 12. Self-tapping screws 81 are inserted in the several previously drilled and aligned holes in the right-angled leg 80 of the interlocking head frame member 77 and tightly driven into vertically aligned holes that are drilled at this time in the head rail of the existing window frame 12.

After the interlocking head rail member 77 has been secured and the integral depending leg or projection 82 of the head section 17 of the greenhouse frame has been dropped into and retained in the recess formed by the hook-like end of the vertically depending leg 79 of the interlocking member 77, the sill section 22 of the greenhouse frame is secured to the sill member of the existing window frame 12. Self-tapping screws 81 are inserted in previously aligned drilled holes in the rear top surface of the greenhouse frame sill member 22 and driven tightly into aligned holes that are drilled at this time in the sloping portion of the sill member of the existing window frame 12.

Having completed the attachment of the head and sill members of the greenhouse frame to the respective head and sill members of the existing window frame, the horizontal, transverse and longitudinal level of floor 28 of the greenhouse is checked. If needed, these members are caused to assume a level relation in both directions by a simple up or down vertical adjustment of the support brackets 68. Bolt 69 that holds each bracket 68 to the face of the building wall 13 is loosened and the vertical relationship of each bracket is adjusted so that the flat top surface of their horizontally disposed legs 73 are in level relationship to each other. After this step is accomplished, legs 73 of brackets 68 are securely attached to the underside of the plywood floor 28 by two or three common wood screws 83 inserted in countersunk, previously drilled holes in the forwardly extending legs 73 of the brackets and then driven into the underside of floor 28 to retain the level relationship of the same.

The next and final step in the installation of the greenhouse consists of the attachment of the interlocking jamb frame members 84 to the rear vertical jamb sections 26 of the greenhouse frame structure 14. The interlocking jamb frame members are fabricated of extruded sections that are identical to the interlocking head frame member 77 and function to secure the right and left jamb frame sections 26 of the greenhouse frame to the corresponding jamb sections of the existing window frame 12.

It should be noted that most of the steps or operations required for the installation of the greenhouse are easily accomplished from the inside of the window opening in the room or area of the building in which it is located and that the previously removed framed and glazed panel 48 and adjustable shelf 29 can also be installed from the inside of the same.

Figure 14:
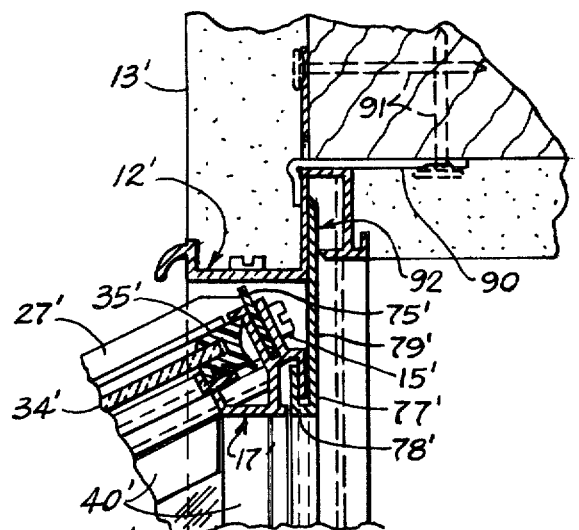
FIGS. 14, 15 and 16 are modified sectional views similar to FIGS. 2, 6 and 9, respectively, that are applicable to the use of the window greenhouse of the present invention in conjunction with window openings and frames in new construction. These views illustrate possible changes in the window frame and wall construction of the building that would facilitate the means of attachment of the greenhouse thereto.
Figure 17:
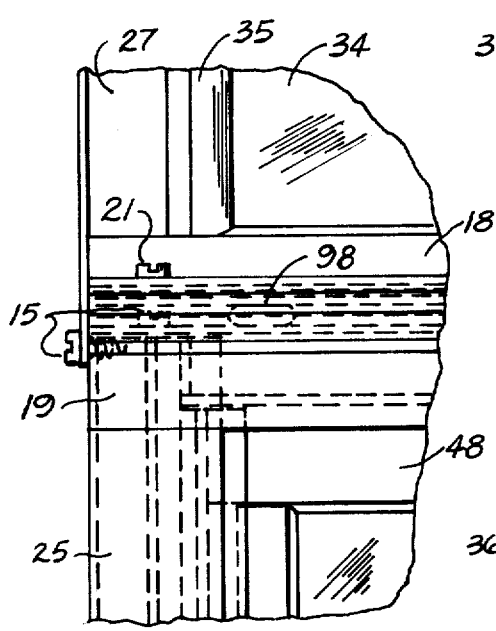
FIG. 17 is a front exterior elevational view of the upper left hand corner junction of the respective elements of the greenhouse frame, as indicated by the circle 17 in FIG. 1.
Figure 15:
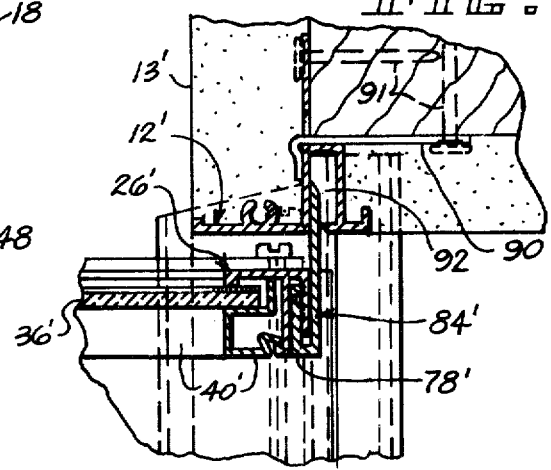
Figure 18:
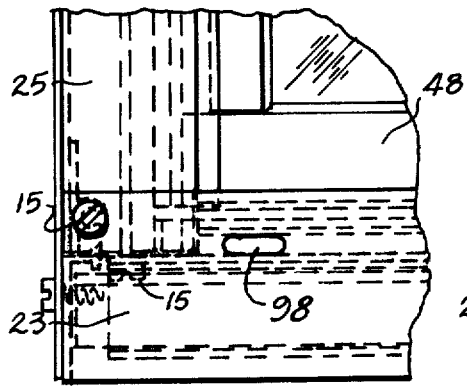
FIG. 18 is a front exterior elevational view of the lower left-hand corner junction of the respective elements of the greenhouse frame as indicated by the circle 18 in FIG. 1.
Figure 16:
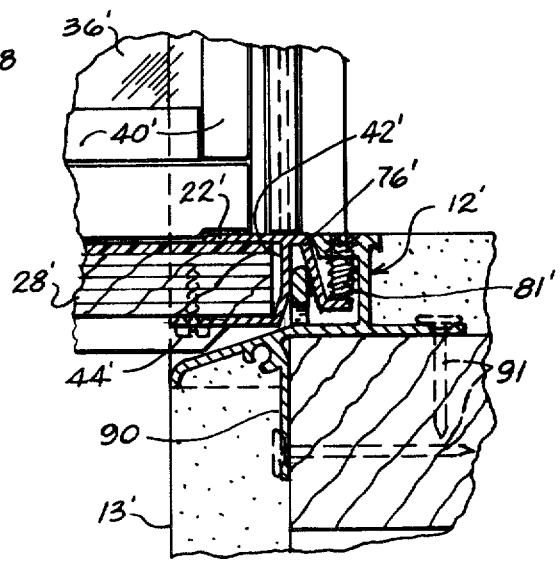

FIGS. 14, 15 and 16 of the drawings are modified sectional views similar to FIGS. 2, 6 and 9 of the invention. They are applicable to the use of the disclosed window greenhouse in conjunction with window openings and frames designed for new construction and illustrate possible changes in the window frames and wall construction of the building that would facilitate the attachment of the window greenhouse thereto.

It should be noted that the reference characters used in describing the components of the window greenhouse and the existing window frame to which it is attached in the preferred embodiment of the invention are repeated with prime denotations for similar or like components.

FIGS. 14 and 15 disclose window head and jamb frame members 12' and 12'', respectively, that are fabricated of extruded metal sections and are contoured to receive exterior and interior stucco, plaster, plaster board or the like in the conventional manner. These sections together with the newly designed sill member (shown in FIG. 16) when assembled into a rectangular form by means of screws, welding or otherwise are secured to the framing of the building by nailing fins or nailing clips 90 and suitable nails 91 to outline the window opening with a strong, rigid frame structure to which the window greenhouse may be easily and readily attached.

The head member 17' and the rear, vertical jamb members 26' of the greenhouse structural frame are identical with their counterparts in the previously described preferred embodiment of the invention with one exception; that is, the height of the angular flashing member 75' has been reduced so that its outer end just comes into contact with the underside of the forwardly projecting, horizontally disposed leg of the new head frame member of the window frame 12', thereby providing a water deflecting lip at its outer end, as shown in FIG. 14.

The rear sill section 22' of the greenhouse structural frame has been redesigned to provide an angular depending leg 76' having a rearwardly projecting horizontal extension which leg, together with the depending leg 42' of the sill section, is adapted to form a wedge-like recess or cavity that in turn is adapted to receive the front upstanding leg of the sill member of the window frame 12' in supporting relation, as shown in FIG. 16. The sill section 22' of the greenhouse frame is securely attached in adjustable leveled and removable relationship to the upstanding, flat topped rear leg of the window frame sill member as means of several self-tapping screws 81'. These screws are driven through holes in the flat top portion of said rear leg into tight contact with the top face of the rearwardly projecting extension of the depending leg 76' of the greenhouse frame's rear sill member 22'.

Previous to the attachment of the sill member of the greenhouse frame structure to the sill member of the newly designed window frame as described above, its head section 17' is securely attached to the head member of the window frame by the interlocking head frame member 77'.

The interlocking head frame member 77' is provided with the recess-forming hook-like portion 78' at the inwardly projecting end of its flat vertically disposed leg or spline portion 79'.

The interlocking head frame member 77' and the identical interlocking jamb frame members 84' also having the recess-forming hook-like portions 78' are adapted to receive the inwardly projecting legs of the respective head frame member 17' and the vertically extending, rear jamb frame members 26' in the same manner as described relative to their counterparts in the preferred version of the invention. When being connected to the head frame member 17' and the jamb frame members 26' of the greenhouse frame structure, the interlocking head and jamb frame member 77' and 84' are forced or otherwise driven into the longitudinally and vertically disposed slots and cavities 92 formed in the inner faces of the head and jamb window frame members by the rear intersection of their extruded contours to provide a means for securely attaching the head and jamb sections of the greenhouse frame to the respective members of the new window frame 12' without the need of screws.

After the above described procedure has been accomplished, the sill member 22' of the greenhouse frame may be securely attached to the sill of the window frame and assembled greenhouse by means of the self-tapping screws 81' thereby eliminating the need for any permanent additional support and leveling means, such as support brackets 68, utilized in the preferred version of the invention.

Figure 19:
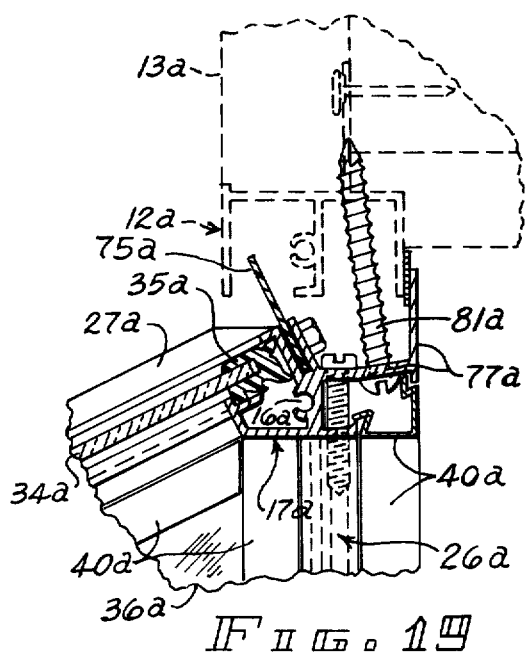
FIGS. 19, 20 and 21 are sectional views taken through the rear head, jamb and sill frame sections of the window greenhouse showing further modifications that may be made in the respective sections to facilitate the attachment of its frame to an existing window frame.
Figure 20:
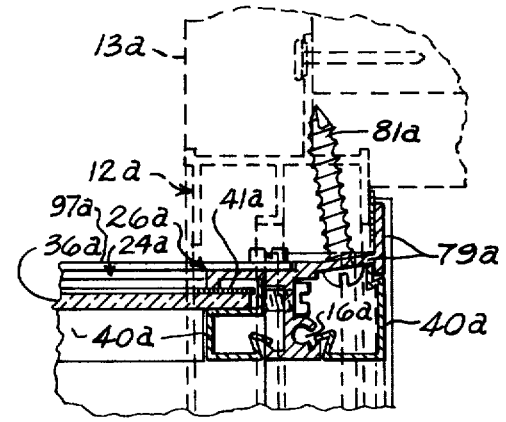
Figure 21:
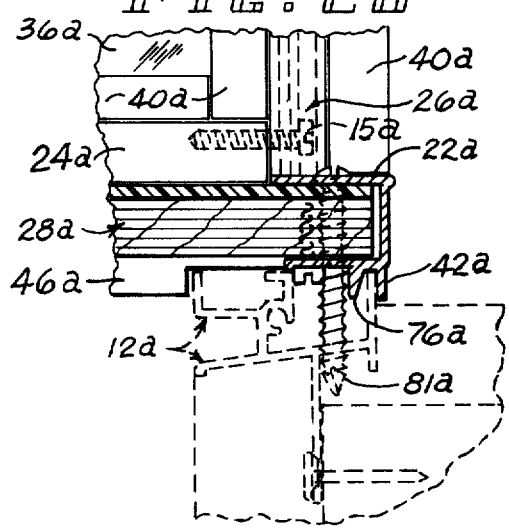

Referring now to FIGS. 19, 20 and 21 of the drawings wherein similar components of the greenhouse frame and the existing window frame to which it is attached are designated by reference characters having the suffix a, head jamb and sill sections 17a, 26a and 22a of the greenhouse frame have been revised in their respective contours in the following manner:

The rear head and jamb sections 17a and 26a have been revised to provide means in the form of horizontally and vertically disposed extensions 77a and 79a, respectively, for attaching the head and jamb sections directly to the head and jamb sections of the existing window frame 12a. This arrangement eliminates the need for the interlocking head and jamb frame members 77 and 84 previously used for this purpose. The contours of the head and jamb frame members also are revised to receive suitable snap-on clips 40a similar to the snap-on glazing members 40 previously described for covering the exposed heads of the self-tapping screws 81a.

The contour of the rear sill section illustrated in FIG. 21 has also been revised by diminishing its width, shortening its depending leg portions 42a and 76a, eliminating one of said legs and increasing the width of the greenhouse floor 28a in such a manner that only the heads of the self-tapping screws 81a which are used to secure the greenhouse sill section 22a to the sill of the existing window frame 12a would be visible.

The described revisions in the respective sections of the greenhouse frame and its means of attachment to the frame of an existing window results in a lower overall cost in the fabrication of these sections and provide for an attractive appearance of the installation from the interior of the window opening.

Figure 22:
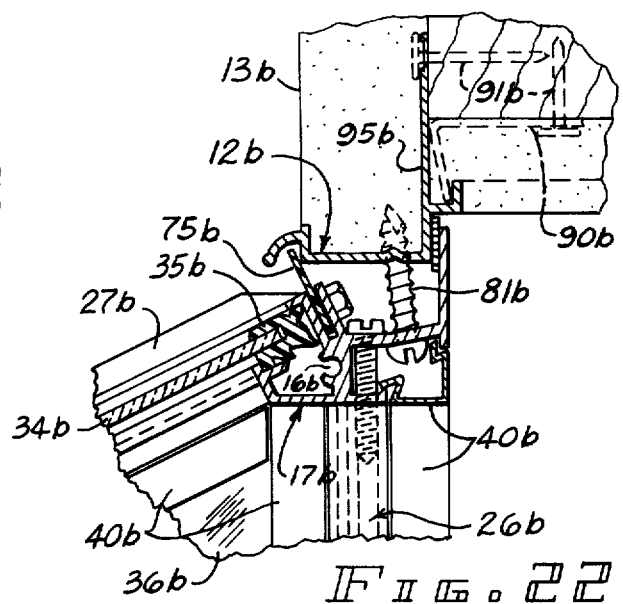
FIGS. 22, 23 and 24 are sectional views taken through the modified rear head, jamb and sill frame sections of the window greenhouse and the window frame utilized in new construction, showing how such modifications in the respective sections would facilitate the attachment of the window frame to the building frame structure and the attachment of the greenhouse frame thereto.
Figure 23:
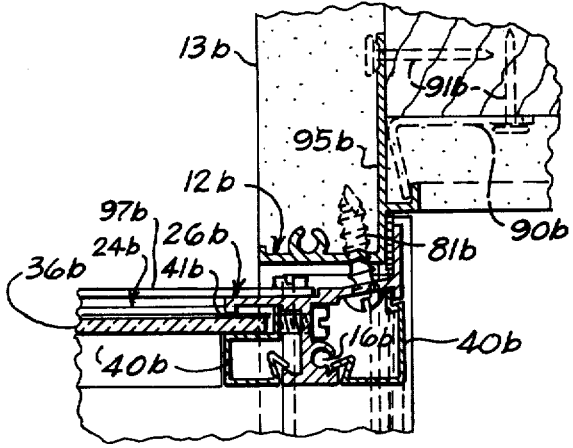
Figure 24:
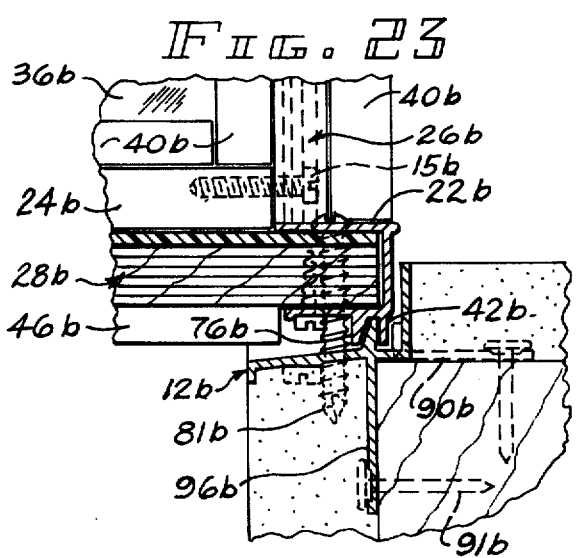

Referring now to FIGS. 22, 23 and 24 of the drawings, it will be seen that the top rear head section, rear vertical jamb sections and rear sill section of the greenhouse frame designated by the reference characters 17b, 26b and 22b, respectively, have been revised in their contours in exactly the same manner and to the same extent as those sections described in the preceding paragraphs relating to the attachment of the greenhouse frame to an existing window frame.

The only revisions necessary to obtain the same desirable results in this modified version of the invention are in the contours of the head and jamb sections of the window frame 12b that has been designed especially for use in new construction. These particular sections have been revised to eliminate the need for the interlocking frame members 27' and 84' previously used for attaching these members to the existing and newly designed window frames 12 and 12'.

The newly designed head, jamb and sill sections of the window frame 12b are provided with suitable means for the reception of exterior and interior stucco, plaster or the like and means in the form of the extensions 95b which together with nailing fins or clips 90b are used with nails 91b to secure said window frame sections directly to the structural framing of the window opening and to their counterparts, the head and jamb sections 17b and 26b of the greenhouse frame by self tapping screws 81b.

The sill section of the newly designed window frame 12b is also provided with means for receiving exterior and interior stucco, plaster or the like and means in the form of the depending extension 96b which together with nailing fins 90b and nails 91b are used to secure this sill section of the window frame directly to the structural framing of the window opening and to its counterpart, the rear sill section 22b of the greenhouse frame by means of self-tapping screws 81b.

It should be recognized that suitable bar brackets 97 may be used to reinforce the structure if so desired, as well as selectively placed weep holes 98 as shown in FIGS. 1, 3, 5, 9, 17 and 18.

Although several embodiments of the invention have been shown and described, it will be apparent to those skilled in the art that various changes and modifications may be made therein without departing from the spirit of the invention or from the scope of the appended claims.

What is claimed is:

1. A window greenhouse comprising in combination:
   a frame formed of a plurality of interconnected sections defining an enclosure,
   one part of said frame comprising a head section, a sill section and a pair of jamb sections,
   said head section and sill section being arranged in spaced parallel arrangement to fit juxtapositioned to the head and sill members of a window frame,
   each of said jamb sections interconnecting a different end of the head section and sill section forming a frame defining an opening fitting within the opening of the window,
   said head section comprising an extrusion having a longitudinally projecting flange or spline extending over a flange on the head member of the window for interlocking said rectangular frame to said head member of said window,
   said sill section comprising an extrusion having a longitudinal projecting flange extending over a flange on the sill member of the window for interlocking said sill section of said rectangular frame to said window,
   attachment means extending through each end of said sill section and said head section and into the frame of said window for anchoring said rectangular frame to the window,
   said frame further comprising gable side rail sections extending laterally outwardly one from each end of said head section, an eave section interconnecting the free ends of said gable side rail sections, side sill sections extending outward from each end of said sill section in the same direction as said gable side rail sections and a second sill section interconnecting the free ends of said side sill sections, and
   a pair of corner jamb sections one interconnecting each of the ends of said gable side rail sections, said eave section, and said sill sections to form said enclosure, each of the gable side rails detachably interlocking with said head section and further provided with an outstanding flange which interlocks with a bracket fastened to the head member of the window.

2. The window mounted greenhouse set forth in claim 1 in further combination with:
   means for enclosing the outline formed by said gable side rail sections, side sill sections, eave sections, second sill sections and said corner jamb sections.

3. The window mounted greenhouse set forth in claim 2 in further combination with:
   a mullion extending between said eave section and said second sill section between their ends, and
   window means movably mounted on track means formed on and longitudinally of said eave section and said second sill section.

4. The window mounted greenhouse set forth in claim 2 in further combination with:
   a shelf adjustably mountable on said jamb sections and said corner jamb sections for holding plant life.

5. The window mounted greenhouse set forth in claim 1 wherein:
   said attachment means comprises suitable screw or bolt means.

6. The window mounted greenhouse set forth in claim 1 in further combination with:
   bracket means adjustably mountable below the window frame on its supporting structure for aiding in the support of the greenhouse.

7. The window mounted greenhouse set forth in claim 2 wherein:
   said shelf comprises a rectangular frame formed from transversely arranged channel-shaped members,
   a wire grill assembly arranged within the outline of said frame and supported therein by said channel-shaped members, and
   clamping means interconnecting the transversely arranged channel-shaped members for holding said wire grill assembly within said frame.

8. The window mounted greenhouse set forth in claim 7 wherein:
   said wire grill assembly comprises a plurality of wires arranged transversely of each other with their free ends held by the transversely arranged channel-shaped members forming said frame.

* * * * *